United States Patent
Song

[11] Patent Number: 5,911,432
[45] Date of Patent: Jun. 15, 1999

[54] TWO SEAT BABY CARRIAGE

[75] Inventor: Zheng Huan Song, Kunsan, China

[73] Assignee: Jiangsu Goodbaby Group, Inc., Kunsham City, China

[21] Appl. No.: 08/914,598

[22] Filed: Aug. 18, 1997

[30] Foreign Application Priority Data

Aug. 22, 1996 [CN] China ............................. 96230539.1

[51] Int. Cl.$^6$ ............................................ B62B 7/08
[52] U.S. Cl. .................. 280/643; 280/648; 280/47.38; 280/658
[58] Field of Search ............................. 280/642, 647, 280/644, 650, 658, 47.38, 47.4, 643, 47.35, 47.39, 30

[56] References Cited

U.S. PATENT DOCUMENTS

| | | | |
|---|---|---|---|
| 2,743,937 | 5/1956 | Ginsberg | 280/41 |
| 3,309,101 | 3/1967 | Romay | 280/47.38 |
| 4,542,915 | 9/1985 | Wheeler, III et al. | 280/642 |
| 4,597,116 | 7/1986 | Kassai | 5/99 A |
| 4,763,919 | 8/1988 | Nakao et al. | 280/47.35 |
| 4,858,947 | 8/1989 | Yee et al. | 280/644 |
| 4,886,289 | 12/1989 | Yee et al. | 280/643 |

*Primary Examiner*—Lanna Mai
*Assistant Examiner*—Bridget Avery
*Attorney, Agent, or Firm*—Lyon & Lyon LLP

[57] ABSTRACT

A two seat baby carriage which is easy to fold and can be easily converted into a one seat carriage.

11 Claims, 2 Drawing Sheets

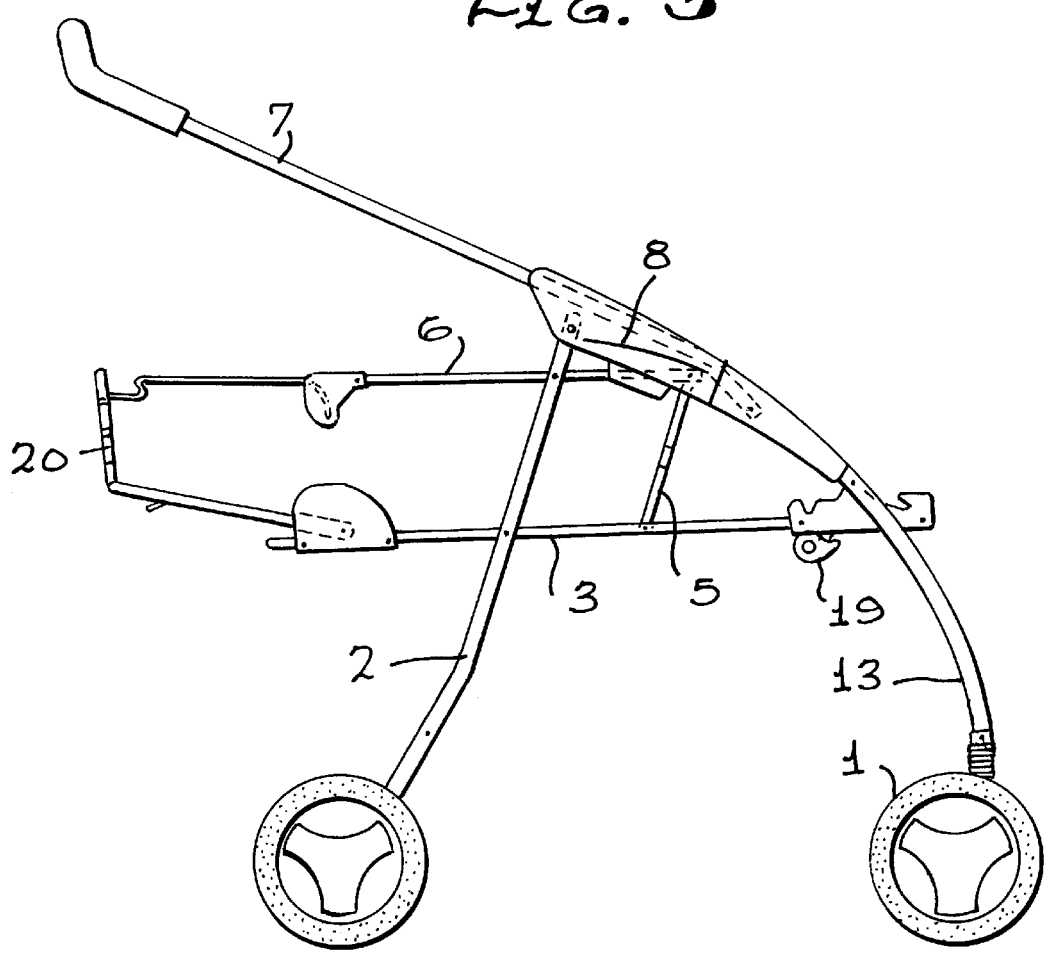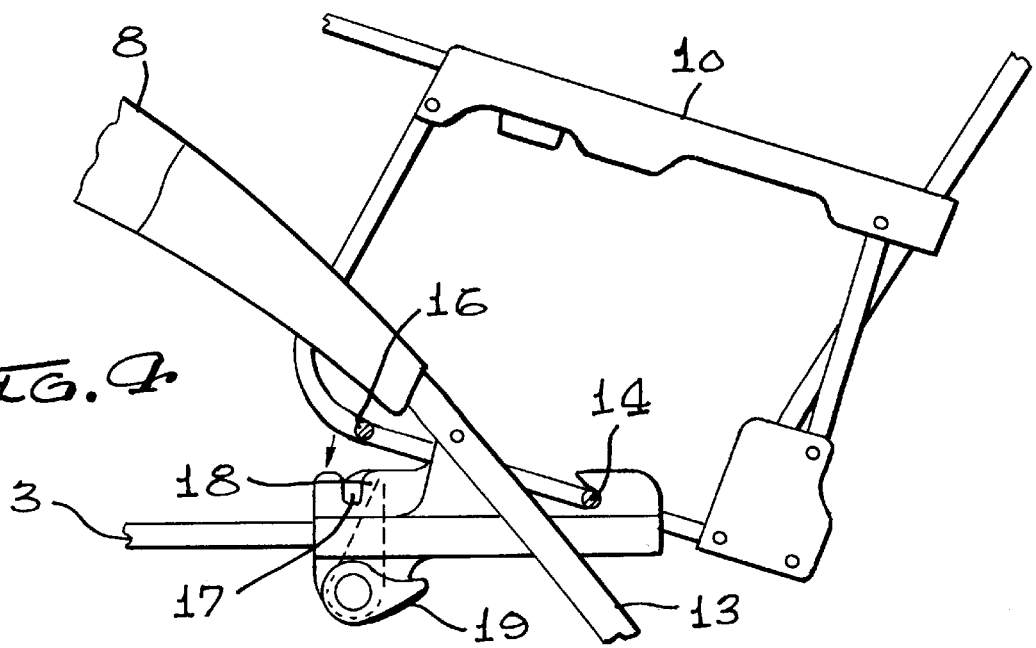

TWO SEAT BABY CARRIAGE

RELATED APPLICATION

This application claims the priority benefits of Chinese application Ser. No. 96230539.1 filed on Aug. 22, 1996, the content of which is incorporated by reference herein in its entirety including its drawings.

BACKGROUND OF THE INVENTION

Baby carriages generally are designed to carry one child. In some cases, two seats are mounted on a carriage frame to carry two kids. However, the additional seat usually makes it difficult to fold the carriage and leads to bulky volume when the carriage is folded. Furthermore, when only one seat is desired, the additional seat in fold-up form still takes up precious space within the bounds of the baby carriage.

SUMMARY OF THE INVENTION

This invention is directed to a baby carriage which can be easily switched from two seats to one seat and vice versa without making it difficult to fold the carriage.

Thus, in one aspect, this invention is directed to a baby carriage comprising two lateral support frames connected through crosswise links. Each lateral support frame has a front strut, a front leg and a rear leg. Within each lateral support frame, the front part of the front strut is articulated with the upper part of the front leg and a locking device is provided at their connection; the rear part of the front strut is articulated with the upper part of the rear leg. When the locking device is unlocked, the front strut and the front leg naturally rotate towards each other to fold up the carriage frame. A bracket is articulated with the front and rear legs. Wheels are positioned on the front and rear legs; a push rod is connected with the front struts; a rear seat is positioned at the rear part of the bracket and a removable front seat is positioned at the front part of the bracket; a locking device is provided between the front seat and the carriage frame.

The design of this invention provides the following advantages:

(1) The carriage frame as composed of the front legs, the front strut, the rear legs and the bracket is very simple and forms a stable triangular structure when unfolded. During folding, the front legs turn clockwise or counterclockwise in one direction while the front struts turn in the opposite direction to complete the fold-up of the carriage laterally. Such design allows a user to fold the carriage with one hand while holding a child with the other hand.

(2) Because the front seat is connected to the carriage frame through a locking device and can be removed from the carriage frame by unlocking the locking device, this two seat carriage can be easily converted into a one seat carriage. The additional space created when the two seat carriage is converted into a one seat carriage allows the remaining seat to be adjusted to permit the child to lie flat in the seat.

(3) The front seat can be unlocked from the bracket, turned around in 180 degrees, and placed on the bracket again and locked. Thus, the two seats can be arranged to either face each other or face the same direction.

Other features and advantages of the invention will be apparent from the following detailed description of the invention, and from the claims.

BRIEF DESCRIPTION OF THE DRAWINGS

Drawing 1 is a perspective view of an exemplary carriage.
Drawing 2 is a side view of a folded lateral support frame.
Drawing 3 is a side view of an unfolded lateral support frame.
Drawing 4 is a schematic drawing of an articulated connection between the front seat and the bracket.

The parts shown in these drawings are numbered as follows:

Figure 1:
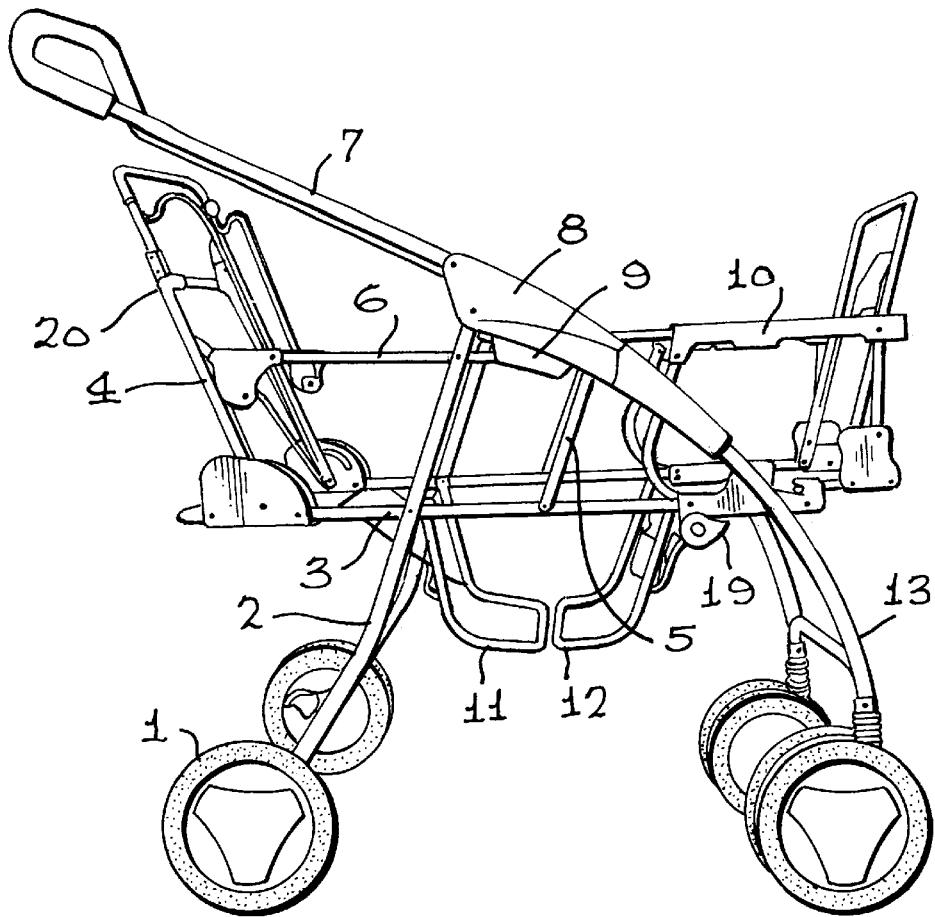
Figure 2:
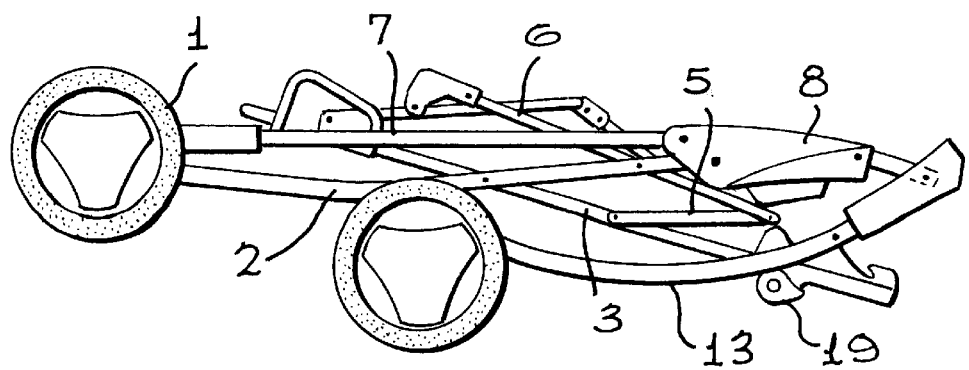

(1) wheel; (2) rear leg; (3) bracket; (4) rear seat; (5) armrest brace; (6) armrest; (7) push rod; (8) front strut; (9) locking handle; (10) front seat; (11) rear footrest; (12) front footrest; (13) front leg; (14) front pin; (15) front fastening groove; (16) rear pin; (17) rear fastening groove; (18) fastening plate; (19) fastening plate handle; (20) back frame.

DETAILED DESCRIPTION OF AN EXEMPLARY CARRIAGE

With reference to Drawing 1 and Drawing 3, the articulated connections are hinges. Two symmetrical lateral support frames are connected through crosswise links.

In the lateral support frames, the front part of the front strut (8) is articulated with the upper part of the front leg (13) and a locking device is provided at their connection; the rear part of the front strut (8) is articulated with the upper part of the rear leg (2); a bracket (3) is articulated with the front legs (13) and the rear legs (2). Wheels (1) are positioned at the lower ends of the front legs (13) and the rear legs (2); a push rod (7) is connected with the front struts (8); a rear seat (4) is positioned at the rear part of the bracket (3); a removable front seat (10) is positioned at the front part of the bracket (3); a locking device is provided between the front seat (10) and the carriage frame.

A basket can be hitched under the bracket (32) and an armrest (6) is positioned horizontally (within plus or minus 10 degrees) above the bracket (3); this armrest (6) serves as an armrest for the rear seat (4) and is articulated with the upper part of the rear leg (2); the bracket (3) is articulated with the lower end of armrest brace (5) and the upper end of a armrest brace (5) is articulated with the armrest (6); the armrest brace (5) supports the armrest (6).

For the purpose of accommodating two seats, the bracket (3) is extended horizontally backward from the point where the bracket (3) is articulated with the rear leg (2) and a rear seat (4) is positioned at the extended portion. The armrest (6) is extended horizontally forward from the point where the armrest articulates with the rear leg (2), the forward end of this extended armrest (6) is articulated with the upper end of the armrest brace (5); the lower end of the armrest brace (5) is articulated with the bracket (3) at a location midpoint between the rear leg (2) and the front leg (13). The connection between the armrest (6) and the armrest brace (5) is located inside the front struts (8). The armrest (6) and the armrest brace (5) are situated to partially block the space between the front strut (8) and the bracket (3) so as to keep a child's feet from stretching out therefrom. The armrest (6) and the armrest brace (5) do not impede folding the carriage as shown in Drawing 2. The front strut (8) and the front leg (13) are curved outward to reduce the distance between the front wheels and the rear wheels.

With reference to Drawing 1 and Drawing 4, a front fastening groove (15) and a rear fastening groove (17) are provided in the front part of the bracket (3). A front pin (14) is positioned at the front part of the front seat (10) bottom. A rear pin (16) is positioned at the rear part of the front seat (10) bottom. The front pin (14) can be inserted into the front fastening groove (15) while the rear pin (16) is inserted into the rear fastening groove (17). Alternatively, the rear pin

(16) can be inserted into the front fastening groove (15) while the front pin (14) is inserted into the rear fastening groove (17).

The device to lock the front seat (10) to the carriage frame includes a fastening plate (18) hinged on the bracket (3) and a loaded spring which potentiates the fastening plate (18) to catch and hold a pin. The spring is connected with the bracket (3) and the fastening plate (18). A fastening groove fitting the pins on the front seat (10) is provided on the fastening plate (18). The two fastening plates (18) on the bracket (3) are connected through a crosswise locking link which allows both fastening plates (18) to turn simultaneously for locking-on or unlocking. Another groove (15) fitting the pins of the front seat (10) has an oblique opening. When a pin is inserted obliquely into the fastening groove (15) and another pin is locked-on with the fastening groove (17), the front seat (10) is locked to the bracket (3).

The back frame (20) of the rear seat (4) is articulated with the rear end of the armrest (6) and the rear end of the bracket (3). This back frame (20) serves as the back support of the rear seat (4) when pulled up and shelters the passenger's head when put down.

A rear footrest (11) is provided in the middle part of the bracket (3) to serve as a footrest for the rear seat (4). A front footrest (12) is provided to the front seat (10). A back frame is provided at the rear part of the front seat (10). The inclining angle of the back is adjustable.

Other embodiments of this invention are disclosed in the following claims. As will be obvious to those skilled in the art, variations and modifications may be made without departing from the spirit and scope of the invention.

What is claimed is:

1. A two seat baby carriage having a frame comprising two lateral support frames connected through crosswise links; each said lateral support frame comprises a front strut, a front leg and a rear leg, the front part of said front strut is articulated with the upper part of said front leg and a first locking device is provided at their connection, the rear part of said front strut is articulated with the upper part of said rear leg; a bracket is articulated with the front and rear legs of said two lateral support frames and a plurality of wheels are positioned on said front and rear legs, and a push rod is connected with the front struts of said two lateral support frames;

wherein a rear seat is positioned at the rear part of said bracket, a removable front seat is positioned at the front part of said bracket, and a second locking device is provided between the front seat and the carriage frame.

2. The two seat baby carriage of claim 1, wherein within each said lateral support frame an armrest is positioned horizontally above said bracket and articulated with the upper part of said rear leg; an armrest brace is articulated with said bracket at one end and with said armrest at the other end; said bracket extends horizontally backward from the point where the armrest articulates with said rear leg.

3. The two seat baby carriage of claim 1, wherein said front strut and said front leg are curved outward.

4. The two seat baby carriage of claim 1, wherein a rear footrest for said rear seat is provided in the middle of said bracket.

5. The two seat baby carriage of claim 1, wherein a front footrest is positioned under the front part of said front seat and a back frame is positioned at the rear part of said front seat.

6. The two seat baby carriage of claim 2, wherein said armrest extends horizontally forward from the point where the armrest articulates with said rear leg until it meets and articulates with the upper end of said armrest brace; the lower end of said armrest brace is articulated with said bracket at a position between said rear leg and said front leg.

7. The two seat baby carriage of claim 2, wherein the rear end of said armrest and the rear end of said bracket are articulated with the back of said rear seat.

8. The two seat baby carriage of claim 6, wherein the connection point between said armrest and said armrest brace is located inside said front struts.

9. A two seat baby carriage having a frame comprising two lateral support frames connected through crosswise links; each said lateral support frame comprises a front strut, a front leg and a rear leg, the front part of said front strut is articulated with the upper part of said front leg and a first locking device is provided at their connection the rear part of said front strut is articulated with the upper part of said rear leg; a bracket is articulated with the front and rear legs of said two lateral support frames and a plurality of wheels are positioned on said front and rear legs, and a push rod is connected with the front struts of said two lateral support frames;

wherein a rear seat is positioned at the rear part of said bracket, a removable front seat is positioned at the front part of said bracket, and a second locking device is provided between the front seat and the carriage frame; and a front fastening groove and a rear fastening groove are provided in the front part of said bracket; a front pin is positioned at the front bottom of said front seat; a rear pin is positioned at the rear bottom of said front seat; furthermore, said front pin and rear pin are inserted in said front fastening groove and said fastening groove respectively or in a reverse order.

10. The two seat baby carriage of claim 9, wherein said second locking device for locking said front seat to said carriage frame is positioned between said pins and said bracket; said second locking device comprises (a) a fastening plate hinged on said bracket and having an open fastening groove at its end to hold a pin at the bottom of said front seat, and (b) a spring connecting said fastening plate to said bracket, said spring is loaded to potentiate said fastening plate to catch and hold said pin at the bottom of said front seat.

11. The two seat baby carriage of claim 10, wherein said second locking device comprises two of said fastening plates connected through a crosswise locking link and said two fastening plates lock and unlock simultaneously.

* * * * *